United States Patent [19]

Shaw

[11] 3,727,417
[45] Apr. 17, 1973

[54] SUBMARINE PIPELINE LAYING APPARATUS

[75] Inventor: Clarence W. Shaw, Metairie, La.

[73] Assignee: J. Ray McDermott & Co., Inc., New Orleans, La.

[22] Filed: July 23, 1971

[21] Appl. No.: 165,054

[52] U.S. Cl. .............................. 61/72.3, 9/8, 114/.5
[51] Int. Cl. .............................. F16l 1/00, F16l 3/00
[58] Field of Search .................... 61/72.3, 72.1, 72.4, 61/46.5; 9/8; 114/.5 F

[56] References Cited

UNITED STATES PATENTS

| | | | |
|---|---|---|---|
| 2,770,950 | 11/1960 | Collins | 61/72.3 |
| 2,395,252 | 2/1946 | Carpenter | 9/8 |
| 2,395,892 | 3/1946 | Lontz | 9/8 |
| 3,594,835 | 7/1971 | Wilson | 61/72.3 X |

FOREIGN PATENTS OR APPLICATIONS

| | | | |
|---|---|---|---|
| 934,151 | 8/1963 | Great Britain | 61/72.3 |
| 942,218 | 11/1963 | Great Britain | 61/72.3 |

*Primary Examiner*—Jacob Shapiro
*Attorney*—Tom Arnold et al.

[57] ABSTRACT

A system for laying a submarine pipeline using releasable floats at spaced points along the pipeline. Three recovery systems for the released floats are disclosed. According to a first system, the adjacent pairs of floats are linked together in a chain by cables so that, after recovery of the first released float, the remaining floats may be collected simply by pulling the cables. According to a second system, after release from the pipeline, each float is moored to the pipeline by an extensible cable that pays out under tension until the float reaches the surface; afterwards, a suitably equipped recovery vessel can pick up the floats which are disposed at the surface in a generally uniform pattern. According to a third system, each float is connected by a cable to a separate reel on a turntable on the lay vessel; after release of a float, a power chuck engages that floats associated reel and reels the float in on the cable. In the first system, the floats are collapsible bags, and a one-way valve is used to exhaust the air in the bag without admitting water. Two different means are disclosed for actuating release of the floats, one upon contact with the marine bottom and the other in response to a cable passing through releasable latches and connected to the ship.

41 Claims, 14 Drawing Figures

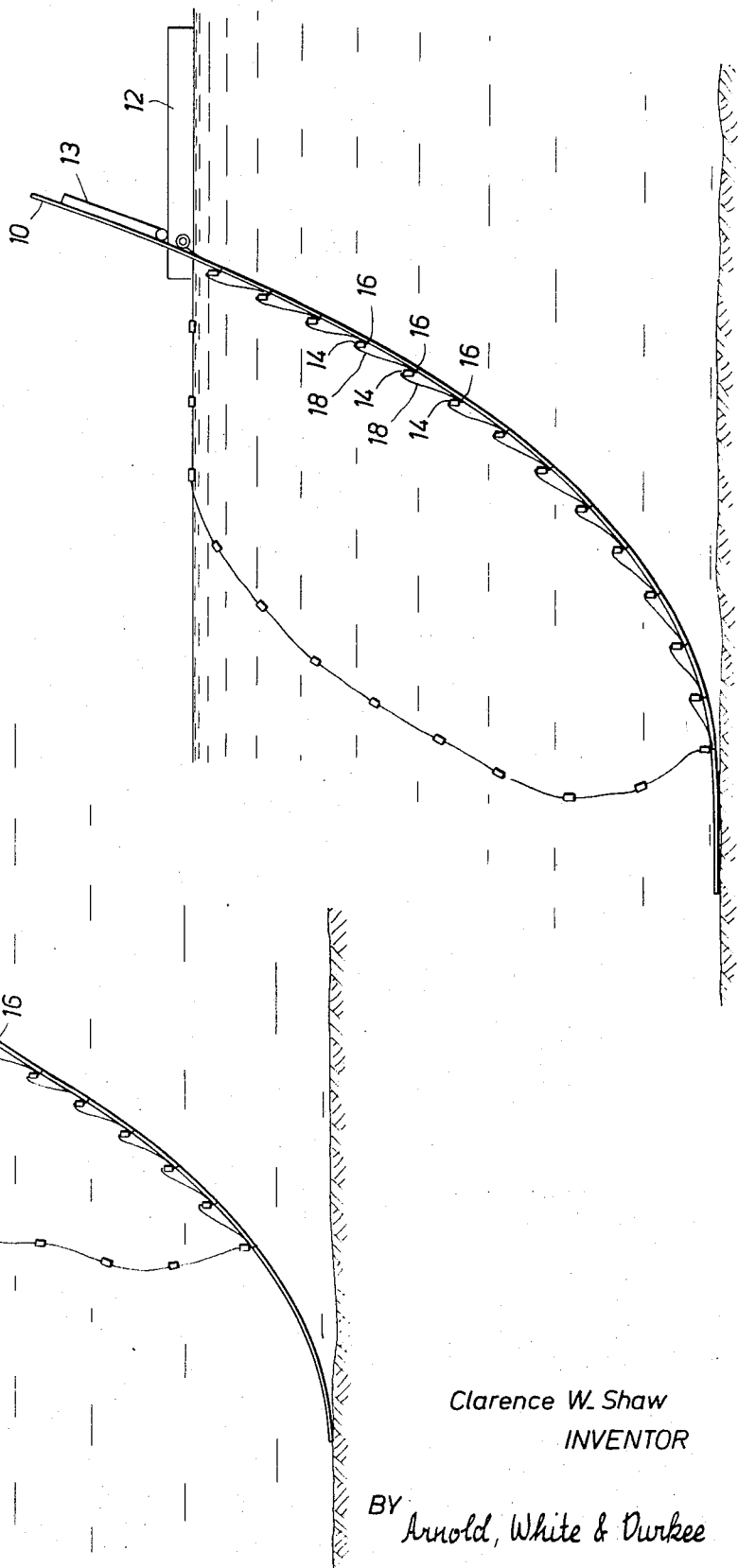

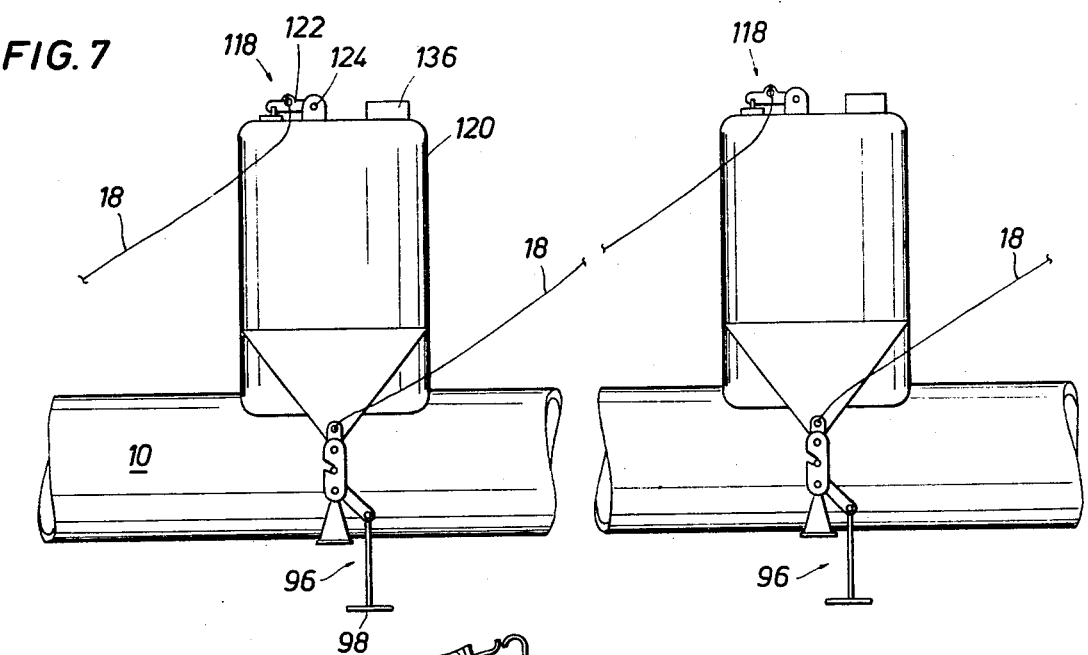
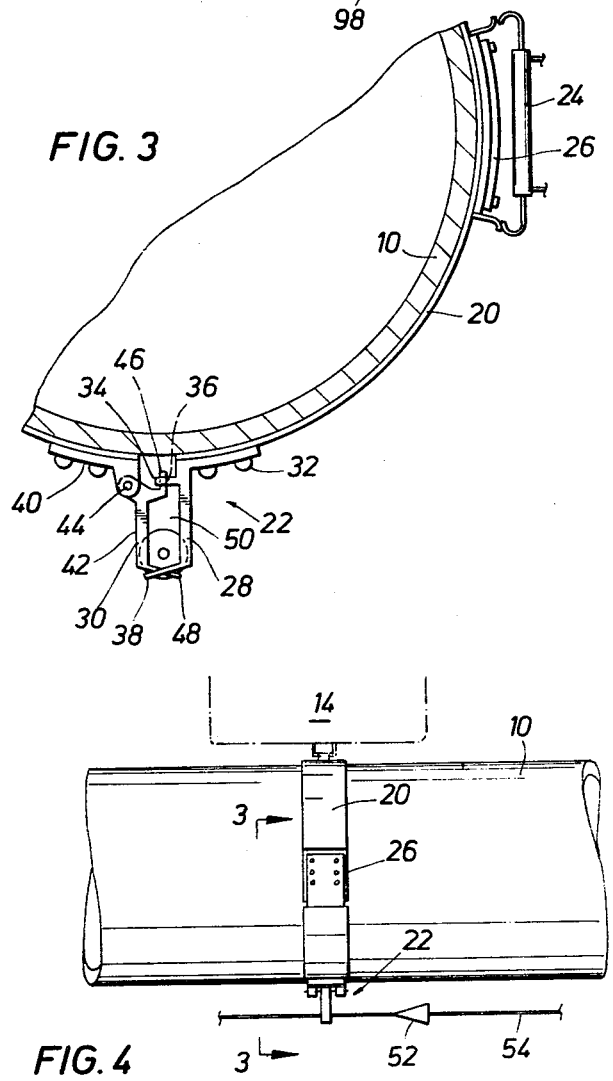
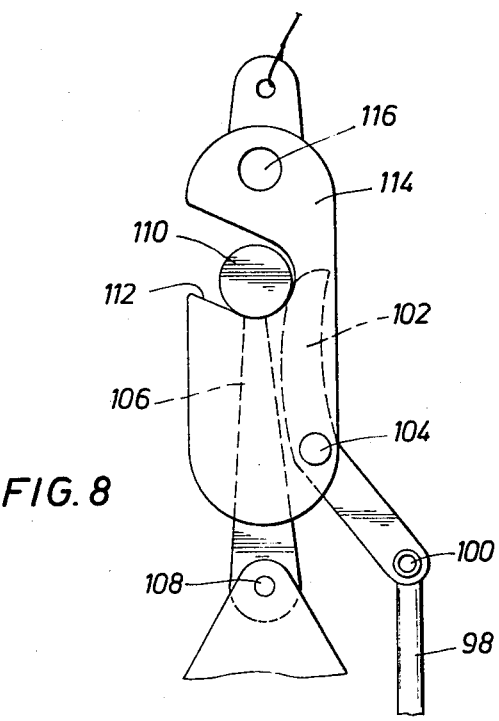
Clarence W. Shaw
INVENTOR
BY Arnold, White & Durkee
ATTORNEYS

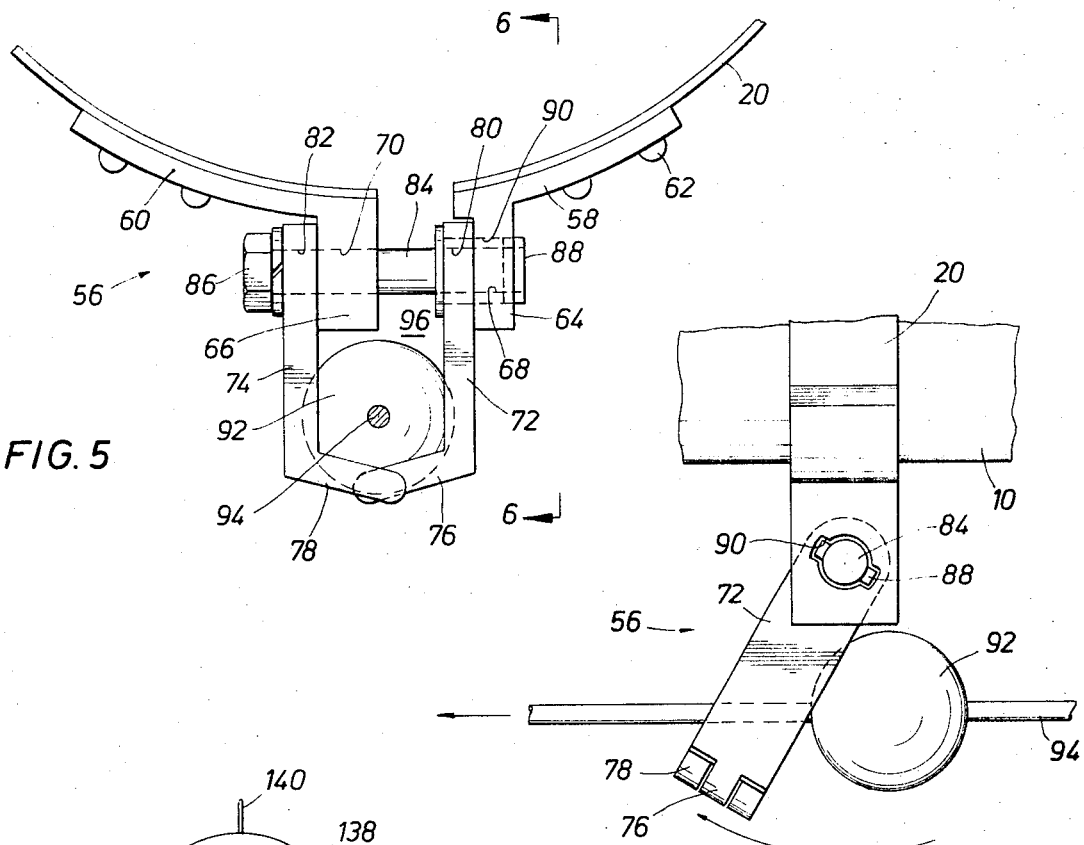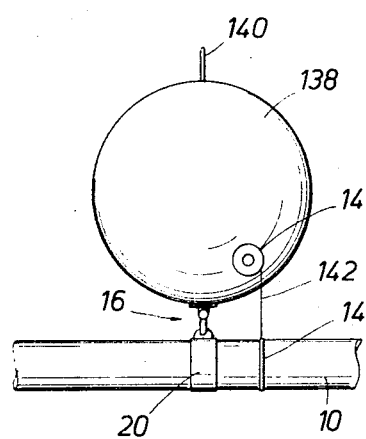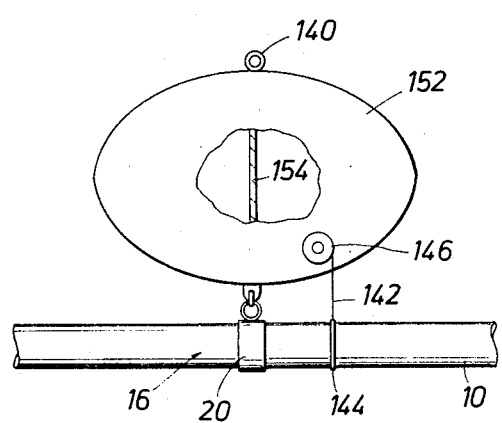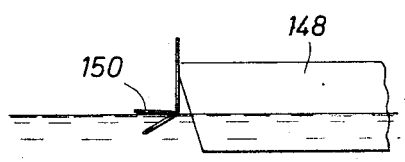

Clarence W. Shaw
INVENTOR

BY Arnold, White & Durkee

ATTORNEYS

SUBMARINE PIPELINE LAYING APPARATUS

BACKGROUND OF THE INVENTION

This invention relates generally to apparatus for use in laying a submarine pipeline, and more particularly to buoyancy apparatus especially suitable for laying a deep water submarine pipeline from a lay vessel or barge.

In laying a submarine pipeline from a lay vessel or barge in shallow water, it is customary to provide support and stability to the pipe string during the laying operation by apparatus known in the art as a stinger, which, in general, is a mechanical structure extending from a hinged joint proximate the rear of the lay barge to the submarine floor or immersed bottom. Conventionally, the lower end of the stinger is equipped with a shoe which supports the stinger for movement along the immersed bottom.

However, a stinger long enough to reach the immersed bottom is impractical for laying a pipeline in deep water having depths in the order of magnitude of 200–300 feet or more and often 1,000 feet or more. And a stinger typically lacks the desired or, in some events, necessary degree of stability when the lower extremity of the stinger is not firmly supported from the immersed bottom. Although a large measure of stability can be achieved by applying tension to the pipe string at the lay barge with a stinger not supported at its lower extremity, the cumulative effect of pipe tension and a stinger are often insufficient for laying a pipeline in increasing water depths.

Accordingly, the prior art has long recognized the advantages of using buoyancy or flotation means for supporting the pipe string during the laying operation. Examples of that prior art are U.S. Pat. No. 2,910,835 issued to Timothy on Nov. 3, 1959; U.S. Pat. No. 3,262,275 issued to Perret on July 26, 1966, U.S. Pat. No. 3,512,367 issued to McLallen on May 19, 1970, U.S. Pat. No. 3,524,325 issued to Brown on Aug. 18, 1970, and U.S. Pat. No. 3,568,456 issued to Loenen on March 9, 1971. Moreover, certain of that prior art, notably Timothy but also McLallen and Loenen, disclose individually releasable flotation means. Nevertheless, there is no prior art apparatus enabling the practical and expeditious recovery of flotation means individually released from a pipe string during the laying of a submarine pipeline from a lay barge or vessel. To the extent that those flotation means have been recovered in the past, usually an auxiliary recoveyry vessel has been used to pick up freely floating individually releasable flotation means; but such retrieval is both expensive and time consuming.

SUMMARY OF THE INVENTION

Briefly, in accordance with the present invention, the practical and expeditious recovery of flotation means individually released from a pipe string during the laying of a submarine pipeline from a lay barge or vessel is attained by providing a cable means for either (i) positioning the flotation means in a uniform path for pick up by an auxiliary recovery vessel or (ii) pulling the flotation means back to the lay barge or vessel. According to one embodiment, each flotation means is releasably secured to the pipeline by the cable means which will pay out under a small predetermined tension until the flotation means reaches the surface. According to a second embodiment, adjacent pairs of flotation means are secured to one another by cable means so that the flotation means can be pulled back to the lay barge or vessel from what is, in effect, a single string. It is comtemplated to ordinarliy use adjustable buoyancy flotation means with the second embodiment. According to a third embodiment, each flotation means is individually connected to the lay barge or vessel by separate cable means. The flotation means are released from the pipeline by actuation means responsive to (i) contact with the submarine floor or (ii) adjustments made from the lay barge or vessel in accordance with predetermined conditions. This invention, although especially suitable for use in laying a submarine pipeline in deep water, is also useful in shallow water pipeline laying operations.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings in which like reference characters designate identical or corresponding parts throughout the several views and wherein:

FIGS. 1 and 2 are elevation views of one embodiment of the present invention used in two methods of laying a submarine pipeline;

FIGS. 3–4 and 5–6 are views of two closely related embodiments of suitable releasable fastening means for securing flotation means to a pipeline;

FIGS. 7–8 are views of another embodiment of suitable releasable fastening means for securing flotation means to a pipeline;

FIGS. 10–11 are elevation views of a second embodiment of the present invention;

FIG. 14 is a partial plan view of a recovery vessel suitably equipped to secure released flotation means in accordance with one embodiment of the present invention.

DESSCRIPTION OF THE PREFERRED EMBODIMENTS

Figure 12:
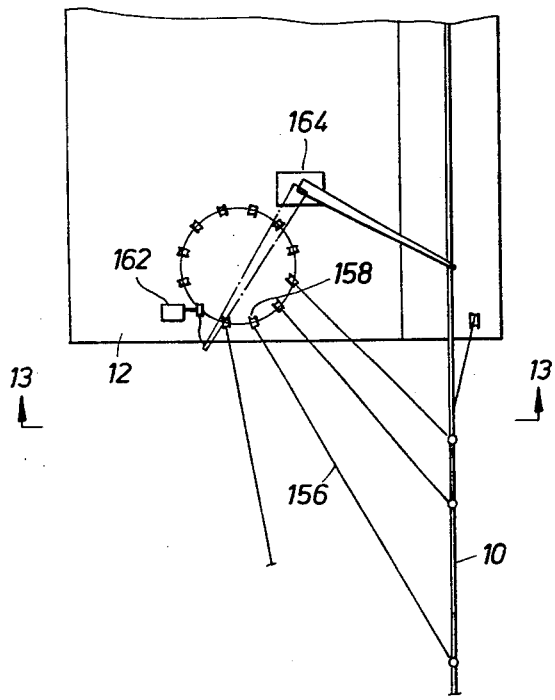
FIGS. 12–13 are plan and elevation views of a third embodiment of the present invention.

Referring now to the drawings, and more particularly to FIGS. 1 and 2 thereof, there are shown two methods for laying a submarine pipeline 10 from a lay vessel or barge 12 by use of a suitable tension machine 13. As will be seen, the present invention, one embodiment of which is shown in FIGS. 1 and 2, is adaptable for use with either method.

As shown in FIGS. 1 and 2, a plurality of individual flotation means 14 are releasably secured to pipeline 10 by suitable fastening means 16, and adjacent pairs of the flotation means are connected to one another by cable means 18. The flotation means may be in any of a number of shapes, including cylindrical, spherical, or ellipsoidal.

As shown in FIGS. 3 and 4, one suitable fastening means includes a band 20 having a break or gap therein which is releasably secured by a suitable mechanical latch, one embodiment of which is designated 22. Initially, the band is placed loosely around the pipeline and the latch is secured. Then, the band is tightened by suitable power means, such as a removable tension cylinder 24; and the tension is maintained by suitable means, such as a fastener 26, after which the power means may be removed.

Although it should be understood that the fastening means may be releasable in response to a variety of stimuli, such as hydrostatic pressure, wireless or wire electrical signals from the lay vessel or some other source, and the like, a relatively simple mechanical release system is presently preferred. For example, latch 22 includes separate first and second parts 28 and 30 fixedly secured to separate ends of band 20 by suitable means, such as rivets 32 or welding. First part 28 preferably is an integral unit having a projecting flange 34 with an aperture 36 therein and having a projecting end 38. Second part 30 preferably is made up of two sections 40 and 42 pivotally mounted relative to one another at 44, section 40 being fixedly secured to band 20. Section 42 has a projecting finger 46 and a projecting end 48. The two parts 28, 30 and the two sections 40, 42 of the second part are so shaped that, in the latched position, ends 38 and 48 overlap or co-engage another to form a closed eye 50, and finger 46 passes through aperture 36 in flange 34. Thus, the engagement of finger 46 in aperture 36 of flange 34 secures parts 28, 30 to one another; however, it should be apparent that pivotal movement of section 42 relative to section 40 about pivot point 44, in a clockwise direction as shown in FIG. 3, would disengage finger 46 from aperture 34 and thereby release latch 22. Pivotal movement of section 42 as just discussed may be effected by the camming action of a wedge or striker member 52 pulled by a cable 54 through eye 50 from right to left as shown in FIG. 4.

A latch 56, similar to latch 22, is shown in FIGS. 5 and 6. Parts 58, 60, fixedly secured to band 20 by suitable means, such as rivets 62 or welding, have projecting flanges 64, 66 with apertures 68, 70 therein, respectively. A pair of arms 72, 74, having projecting ends 76, 78 which are adaptable to overlap and co-engage one another in a dovetail relationship and having apertures 80, 82 at the other ends, are pivotally mounted relative to parts 58, 60 by convenient means, such as shaft 84. In the latched position shown in FIG. 5, parts 58, 60 are secured to one another by shaft 84 having a hexagonal bolt head 86 at one end and having fixedly secured at the other end by any conventional means, such as welding, a key member 88. At least one of arms 72, 74 is fixedly secured to one of shaft 84 or key member 88 so that pivotal movement of the arms in the clockwise direction as shown in FIG. 6 will produce a pivotal movement of key member 88 to bring the key member into alignment with key passageway 90 passing through at least flange 64 of part 58. The pivotal movement just discussed may be effected by the camming action of a striker member 92 pulled by a cable 94 through an eye 96 from right to left as shown in FIG. 6. It should be apparent that when the key member is aligned with the key passageway, the key member will be free to pass through flange 64 of part 58, thus releasing band 20 previously under tension.

Latches 22 and 56 are both responsive to the camming action of a striker member pulled by a cable through a separable eye. It should be apparent that, by pulling the cable from the lay vessel, it is possible to manually control the point of release of the flotation means simply by retracting or extending the length of cable between the lay vessel and the striker. Moreover, it should be apparent that the flotation means may be released in some predetermined order, such as every other one at one point and the remainder at some lower point simply by using two different sized strikers and eyes. By putting a small striker closer to the lay vessel and a large striker further away and then alternating the size of eyes, the small striker would pass the large eyes but cause release of latches with small eyes. Of course, other variations in release patterns may be obtained in like fashion. When variations other than serial release are used in the embodiment shown in FIGS. 1 and 2, it may be necessary to attach each flotation means to its next adjacent like flotation means, that is, one that will be released at the same point.

In FIGS. 7 and 8, there is shown a latch 96 responsive to contact of member 98 with the marine bottom. As shown in greater detail in FIG. 8, member 98 is pivotally mounted at point 100 to a cam member 102 which is pivotally mounted at point 104. A cam follower 106 is pivotally connected at point 108; and, as shown in FIG. 8 in the latched position, a stop member 110 secured to one end of the cam follower is positioned in the downward closed end of a slot 112 in member 114 which is pivotally mounted at point 116. It will be readily appreciated that the stop member 110 in slot 112 prevents the release of latch 96 in the latched position shown in FIG. 8. However, upward movement of member 98 upon contact with the marine floor will produce a pivotal movement of cam member 102 about point 104, in a counterclockwise direction as shown in FIG. 8. Cam member 102 will then prooduce a pivotal movement of follower member 106 about point 108, in a counterclockwise direction as shown in FIG. 8; and stop member 110 will ride out of slot 112, thereby releasing latch 96.

It should be apparent that any of the aforementioned latching systems can be used in any of the embodiments of the present invention; and that other types of release techniques might also be employed.

In the embodiment of the invention shown in FIGS. 1 and 2, the flotation means are employed to provide a buoyant force on the pipeline until some predetermimed point, at the marine bottom in FIG. 2 and thereabove in FIG. 1. At the predetermined point at which the flotation means are released from the pipeline, it may be desirable to ensure that there is very little or no buoyant force thereafter applied to the pipeline. In that event, in the embodiment shown in FIGS. 1 and 2, adjacent flotation means are connected by cable means, and the buoyancy of the flotation means must be reduced upon release from the pipeline; otherwise the plurality of released flotation means would produce a cumulative buoyand effect on the pipeline at the release point.

Figure 9:
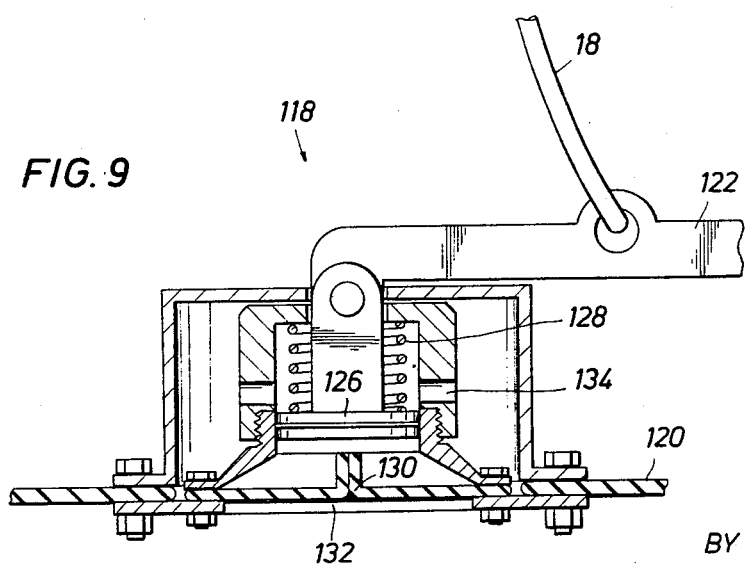
FIG. 9 is an elevation view, partly in section, of a one-way valve suitable for use in a collapsible bag flotation means in accordance with one embodiment of the present invention.

Although the buoyancy of the flotation means may be reduced by any convenient technique, such as flooding, it is presently preferred to use an inflated but collapsible bag as the flotation means for the embodiment shown in FIGS. 1 and 2. As may be seen in FIGS. 7 and 9, a normally closed one-way valve 118 is secured to the upper extremity of each collapsible bag 120, which may be made of rubber or the like. Each valve includes an arm 122, pivotally mounted at one end 124 thereof to the flotation means; the other end of arm 122 is pivotally mounted to a piston 126 which is resiliently biased toward its closed or lower position by a spring 128. In its closed position, piston 126 keeps a resilient lip valve 130 in its closed position bearing against a grid or screen 132; and piston 126, being below ports 134, functions as a closed piston valve. Arm 122 is connected by cable means 18 to the preceding flotation means.

In operation, tension on cable means 18 produced by the release of the preceding flotation means will cause an upward movement of the piston end of arm 122, thereby opening the piston valve and releasing the lip valve. The buoyant pressure of the air or other gas in bag 120 will open the lip valve against the hydrostatic pressure, allowing the air to escape. The grid or screen under the lip valve allows the use of a very sensitive highly resilient rubber for the lip valve; that is quite important to allowing the escape of air without admitting any substantial amounts of water. The deflating procedure is a more desirable method of reducing the buoyancy of the flotation means than is flooding since subsequent recovery of lighter flotation means is much easier.

In accordance with the foregoing description, substantially all of the air in the bag is released prior to the release of the flotation means from the pipestring, thereby effectively precluding buoyancy accumulation at the release point. A very small amount of buoyancy, usually desirable even after the release of the entrapped air, may be achieved by the use of a float 136 attached to the flotation means by any suitable technique.

In operation of the first embodiment, individual flotation means 14 are releasably secured at spaced points to pipeline 10 on lay vessel 12 by loosely fitting band 20 around the pipeline with the appropriate latch mechanism secured. The band may be secured to the flotation means by any conventional, such as a swival joint, either before or after the band is tightened around the pipeline by removable tension cylinder 24. Each flotation means is equipped with one-way valve 118 having arm 122 connected to the preceding flotation means by cable 18. Shortly before any given flotation means reaches its predetermined release point, the tension on cable 18 betweeen the valve arm and the preceding flotation means caused by the slight buoyancy provided by floats 136 on the released flotation means, will open the valve so that substantially all of the air in the flotation bag is evacuated. Of course, that deflation of the flotation bag is independent of the subsequent release of the flotation means from the pipeline which is occasioned by actuation of the particular latch means employed. As previously described the latch means may be released or opened upon contact with the marine bottom or by passing a striker through an eye by means of a cable leading to the lay vessel. After the latch is opened, the band separates and the flotation means is released thereby applying a tension on the cable attached to the valve arm on the next flotation means. It should be apparent that a separate long cable should be attached to the first flotation means and extend to the lay vessel for recovery of that flotation means; the subsequent flotation means are all connected in a string or chain by cable means 18 so that their recovery is made quite simple. Of course, the lead cable to the first flotation means may extend to an auxiliary recovery vessel or there may be no lead cable at all. One advantage of this and other embodiments in the ease of recovery of released flotation means in that it is not necessary to recover individual freely floating flotation means at wholly randon points on the surface. By the use of this embodiment, regardless of how the first flotation means is recovered, all subsequent flotation means are interconnected and the recovery of those subsequent flotation means may be conducted quite expeditiously.

In the two embodiments shown in FIGS. 10 and 11 and FIGS. 12 and 13, for reasons which will become apparent, it is not necessary to use a flotation means having the capability of reducing its buoyancy.

In FIG. 10 there is shown a generally spherical flotation means 138 having a hoisting hook means or eye 140 at the top thereof. Flotation means 138 is releasably secured to pipeline 10 by fastening means 16 in accordance with any of the aforementioned techniques; however, the individual flotation means are not connected to the adjacent flotation means according to this embodiment of the invention. Instead, cable 142 is releasably connected at one end to pipeline 10 by a frangible band 144 or the like and at the other end to the flotation means via a tensioning device, such as a reel 146 that is spring-loaded, frictional, or the like. In that manner, after the flotation means is deployed and released in the same general manner as in the aforementioned embodiment, the flotation means will still be attached to the pipeline via cable 142. The buoyant force of the flotation means is, however, sufficient to produce just enough tension on cable 142 to overcome the bias of reel 146, thereby paying out additional length of cable as the flotation means rises to the surface. By using a slight bias on the reel, it should be apparent that, once the flotation means has reached the surface, the tension on cable 142 is reduced and no more cable will be payed out. Thus, after the individual flotation means have been released from the pipeline, they will still be releasably moored to the pipeline so thqt the released flotation means will be disposed in a fairly uniform pattern at the surface. Recovery of the individual flotation means may thereafter be accomplished by an auxiliary recovery vessel 148 shown in FIG. 14. The recovery vessel should be equipped, preferably at the bow, with suitable apparatus for breaking frangible band 144 and securing the flotation means. That apparatus may include a forklift mechanism 150 or some other type of platform for securing the flotation means. After the flotation means is secured to the recovery vessel frangible band 144 may be broken by any convenient means, such as tension on cable 142, explsive means actuated by radio signals, or the like.

A generally similar embodiment is shown in FIG. 11, the major difference being the ellipsoidal shape of the flotation means 152 having at least one internal supporting strut 154. By using an ellipsoidally shaped flotation means connected to the pipeline with a certain degree of pivotal freedom, the flotation means will align itself with the underwater current and thereby produce a minimum drag. Although it is presently preferred that the flotation means for the embodiments shown in FIGS. 10 and 11 and FIGS. 12 and 13 be made of metal, it should be understood that other materials could be used.

Figure 13:
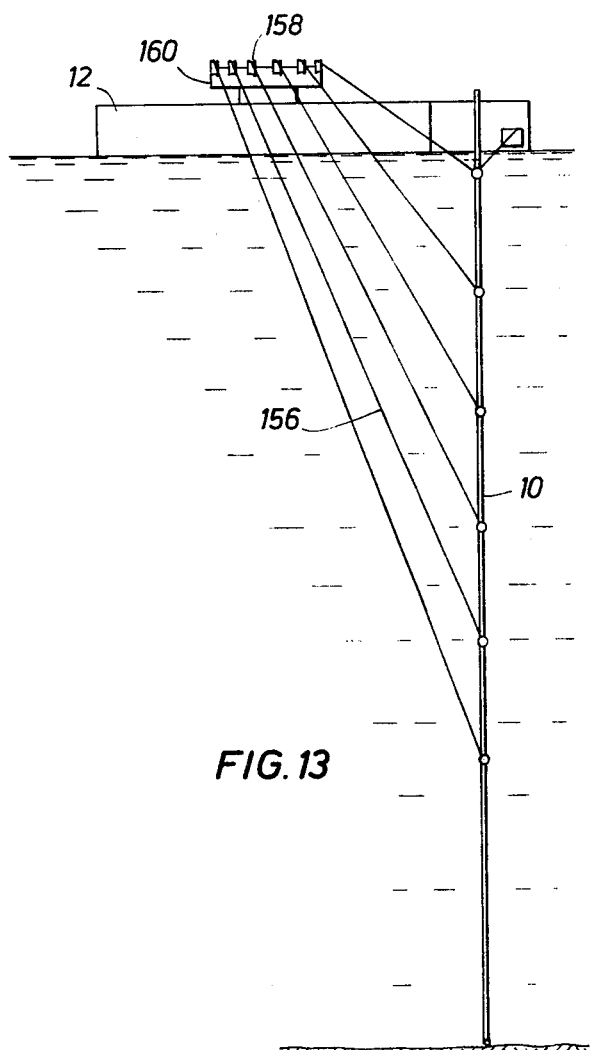

Still another embodiment of the present invention is shown in FIGS. 12 and 13. According to that embodiment, a separate cable 156 is connected to each flotation means and to a rrel 158 mounted on a turntable 160 on the lay vessel 12. The turntable arrangement prevents cables 156 from becoming entangled during the deployment of the flotation means and in addition permits the use of a single fixed location power chuck 162 for reeling in the flotation means after they are released from the pipeline in accordance with any of the aforementioned techniques. Conveniently, a crane 164 may be provided on the lay vessel to aid in the movement of the recovered flotation means.

Obviously, many modifications and variations of the present invention are possible in the light of the above teachings. For example, other types of one-way valves could be used to deflate the collapsible bags in the first emodiment; and it is possible to reduce the buoyancy of a rigid flotation means by flooding or by reducing the displaced volume as by a piston-cylinder arrangement. In addition, there are numerous ways in which flotation means might be releasably secured to the pipeline, such as an explosive coupling, a pressure responsive mechanical coupling, and the like.

It is therefore to be understood that, within the scope of the appended claims, the invention may be practiced otherwise than as specifically described, without departing from the spirit and scope of the invention of which only the presently preferred embodiments have been disclosed:

What is claimed and desired to be secured by Letters Patent of the United States is:

1. Apparatus for use in laying a submarine pipeline from a vessel comprising:
   flotation means;
   fastening means for releasably securing said flotation means to the pipeline;
   actuating means for selectively releasing said fastening means;
   cable means for connecting said flotation means to the pipeline; and
   extending means for paying out additional length of said cable means between said flotation means and the pipeline in response to a first predetermined tension on said cable means.

2. The apparatus of claim 1 wherein said calbe means is seleively releasably connected to one of said flotation means and the pipeline.

3. The apparatus of claim 2 wherein said cable means is releasable in response to a second predetermined tension on said cable means greater than said first predetermined tension on said cable means.

4. The apparatus of claim 1 wherein said cable means is selectively releasably connected to ne of said flotation means and the pipeline by breakaway means for releasing said cable means therefrom in response to a second predetermined tension on said cable means greater than said first predetermined tension on said cable means.

5. The apparatus of claim 1 wherein said cable means is selectively releasably connected to the pipeline.

6. The apparatus of claim 5 wherin said cable means is releasable in response to a second predetermined tension on said cable means greater than said first predetermined tension on said cable means.

7. The apparatus of claim 1 wherein said cable means is selectively releasably connected to the pipeline by breakaway means for releasing said cable means therefrom in response to a second predetermined tension on said cable means greater than said first predetermined tension on said cable means.

8. The apparatus of claim 1 wherein said flotation means is generally spherically shaped.

9. The apparatus of claim 1 wherein said flotation means is generally ellipsoidally shaped.

10. The apparatus of claim 9 further comprising means for providing at least limited rotational freedom of said flotation means relative to the pipeline.

11. The apparatuks of claim 1 wherein said flotation means comprises at least one hoisting hook means.

12. The apparatus of claim 1 wherein said actuating means comprises striker means; and
   auxiliary cable means for connecting said striker means to the vessel.

13. The apparatus of claim 12 wherein said fastening means includes a releasable latch having an eye provided therethrough and said auxiliary cable means passes through the eye.

14. The apparatus of claim 13 wherein said latch is releasable in response to the bearing engagement of said striker means with said latch.

15. Thd apparatus of claim 1 wherein said actuating means includes means responsive to contact with the marine bottom for releasing said fastening means.

16. Apparatus for use in laying a submarine pipeline from a vessel, comprising:
   a plurality of flo6ation means;
   fastening means for individually releasably securing said flotation means to the pipeline;
   actuating means for selectively releasing individual flotation means from the pipeline at said fastening means; and
   cable means for connecting adjacent pairs of said flotation means.

17. The apparatus of claim 16 wherein each individual flotation means comprises buoyancy adjusting means for selectively decreasing the buoyancy of said individual flotation means.

18. The apparatus of claim 17 wherein said individual flotation means comprises a collapsible gaseous chamber and said buoyancy adjusting means comprises one-way valve means for selectively expelling gas from said chamber without admitting substantial amounts of water.

19. The apparatus of claim 17 wherein said buoyancy adjusting means is actuated in response to a predetermined tension on said cable means connecting said individual flotation means with the immediately preceding individual flotation means.

20. The apparatus of claim 19 wherein said individual flotation means comprises a collapsible gaseous chamber and said buoyancy adjusting means comprises one-way valve means for selectively expelling gas from said chamber without admitting substantial amounts of water.

21. Thd apparatus of claim 20 wherein said one-way valve means comprises a check valve normally resiliently biased toward the closed position.

22. The apparatus of claim 21 wherein said check valve is normally resiliently biased toward the closed position by spring means operatively connected to oppose the tension on said cable means connecting said individual flotation means with the immediately preceding individual flotation means.

23. The apparatus of claim 16 wherien said flotation means is generally spherically shaped.

24. The apparatus of claim 16 wherein said flotation means is generally ellipsoidally shaped.

25. The apparatus of claim 24 further comprising means for providing at least limited rotational freedom of said flotation means relative to the pipeline.

26. The apparatus of claim 16 wherein said flotation means comrises at least one hoisting hook means.

27. The apparatus of claim 16 wherein said actuating means comprises:
 striker means; and
 auxiliary cable means for connecting said striker means to the vessel.

28. The apparatus of claim 27 wherein said fastening means includes a releasable latch having an eye provided therethrough and said suxiliary cable means passes through the eye.

29. The apparatus of claim 28 wherein said latch is releasable in response to the bearing engagement of said striker means with said latch.

30. The apparatus of claim 16 wherein said actuating means includes means responsive to contact with the marine bottom for releasing said fastening means.

31. Apparatus for use in laying a submarine pipeline from a vessel, comprising:
 a plurality of flotation means;
 fastening means for individually releasably securing said flotation means to the pipeline;
 actuating means for selectively releasing individual flotation means from the piepline at said fastening means;
 a plurality of cable means, a separate one of said cable means for connecting a separate one of said flotation means to the vessel; and
 return means on the vessel for individually retrieving said flotation means by said cable means connected thereto after said flotation means have been released from the piepline.

32. The apparatus of claim 31 wherein said return means comrpises a plurality of reel means, a separate one of said reel means for paying out the length of one of said cable means between the vessel and one of said flotation means in response to a predetermined tension on said cable means.

33. The apparatus of claim 32 wherein said individual reel means are mounted at circumferentially spaced points on a turntable means mounted on the vessel.

34. The apparatus of claim 32 further comprising motor means adapted to operatively engage said reel means in said cable means and said flotation means after said flotation means have been released from the pipeline.

35. The apparatus of claim 31 wherein said actuating means comprises:
 striker meana; and
 auxiliary cable means for connecting said striker means to the vessel.

36. The apparatus of claim 35 wherein said fastening means includes a releasable latch having an eye provided therethrough and said auxiliary cable means passes through the eye.

37. The apparatus of claim 36 wherein said latch is releasable in response to the bearing engagement of said striker means with said latch.

38. The apparatus of claim 31 wherein said actuating means includes means responsive to contact with the marine bottom for releasing said fastening means.

39. Apparatus for use in laying a submarine pipeline from a vessel comprising:
 flotation means;
 fastening means including a releasable latch for releasably securing said flotation means to the pipeline; and
 actuating means for selectively releasing said flotation means, said actuating means comprising striker means and
 cable means for connecting said striker means to the vessel.

40. The apparatus of claim 39 wherein said a releasable latch has an eye provided therethrough and said cable means passes through the eye.

41. The apparatus of claim 40 wherein said latch is releasable in response to the bearing engagement of said striker means with said latch.

* * * * *